Patented May 16, 1950

2,507,829

UNITED STATES PATENT OFFICE 2,507,829

ALKYL-SULFONIC ACID SALTS OF DI-HYDRO-ERGOCORNINE

Arthur Stoll and Albert Hofmann, Basel, Switzerland, assignors to Sandoz Limited, Basel, Switzerland, a Swiss firm No Drawing. Application June 5, 1946, Serial No. 674,638. In Switzerland April 20, 1940

3 Claims. (Cl. 260—236)

The present invention is a continuation-in-part of our co-pending patent application, Ser. No. 385,198, filed March 25, 1941, now abandoned, which related to sympatheticolytically active dihydro-derivatives of lysergic acid amides.

The present invention more particularly relates to the preparation of water-soluble salts of dihydro-ergocornine.

Dihydro-ergocornine may be made by a fractional crystallisation of dihydro-ergotoxine, which itself can be produced by treating ergotoxine with hydrogen under pressure in the presence of a suitable catalyst and of a solvent and, in some cases, at an elevated temperature, the method of production of dihydro-ergotoxine being more fully described in our co-pending patent application, Ser. No. 385,198 (cf. Example 3 thereof.)

The dihydro-ergocornine possesses the brutto formula $C_{31}H_{41}O_5N_5$ and is as such almost insoluble in water. The preparation of the water-soluble salts of dihydro-ergocornine can be carried out by neutralisation of a solution or a suspension of dihydro-ergocornine in a suitable solvent with alkyl-sulphonic acids. The salts of the alkyl-sulphonic acids thus obtained are beautifully crystallized compounds which are easily soluble in water giving stable aqueous solutions. The same can be used for therapeutical purposes.

The following examples, without being limitative, describe the present invention.

Example 1

5.63 parts by weight of dihydro-ergocornine ($^1/_{100}$ mol) are dissolved in 100 parts by volume of methanol and treated with 10 parts by volume of a n-methanolic solution of methane-sulphonic acid. By concentration of the solution in vacuo, a thick pap of crystals will be obtained. After a short standing the crystallisation is complete, the crystals being then filtered, washed with some cold methanol and dried in vacuo over calcium chloride. In this manner a first fraction of 6.2 parts will be obtained. By concentrating the mother-liquor a second fraction of 0.3 part of pure salt will be obtained. Therefore, the yield is practically the theoretical one.

The dihydro-ergocornine-methane-sulphonate crystallizes from methanol and ethanol in long thin prisms containing about 5% of crystal solvent and melting at 215° C. (corr.) with decomposition. The brutto formula of the salt is $C_{31}H_{41}O_5N_5 \cdot CH_3SO_3H$. 1 part of the same is soluble either in 10 parts of hot water or in 80 parts of cold water yielding stable solutions. By way of comparison with this salt, reference is made to the solubility of dihydro-ergocornine tartrate, which does not crystallize from usual solvents, only 1 part thereof being soluble in 220 parts of boiling water.

Example 2

The dihydro-ergocornine-ethane-sulphonate can be prepared in analogous manner to the methane-sulphonate, i. e. by neutralisation of the base with ethane-sulphonic acid. The ethane-sulphonic acid salt is soluble in 10 parts of boiling methanol and crystallizes therefrom in thick clear prisms. When recrystallized from hot ethanol, long thin prisms will be obtained which melt at 220° C. (corr.) with decomposition. The new compound has the brutto formula $C_{31}H_{41}O_5N_5 \cdot CH_3CH_2SO_3H$. 1 part thereof is soluble either in 40 parts of hot water or in 400 parts of cold water, yielding stable solutions; the new product is suitable for therapeutical use.

What we claim is:

1. The water-soluble alkyl-sulphonic acid salts of dihydro-ergocornine of the general formula

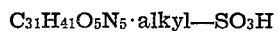
$C_{31}H_{41}O_5N_5 \cdot alkyl—SO_3H$ which are crystallized compounds melting with decomposition and which yield stable aqueous solutions and are suitable for therapeutical use.

2. The water-soluble methane-sulphonic acid salt of dihydro-ergocornine of the formula

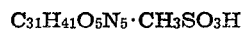
$C_{31}H_{41}O_5N_5 \cdot CH_3SO_3H$ which crystallizes from ethanol and methanol in long thin prisms containing about 5% of solvent and which melts with decomposition at 215° C. (corr.), one part of which is soluble in 10 parts of hot water and in 80 parts of cold water, yielding stable aqueous solutions, and which is suitable for therapeutical purposes.

3. The water-soluble ethane-sulphonic acid salt of dihydro-ergocornine of the formula

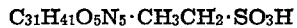
$C_{31}H_{41}O_5N_5 \cdot CH_3CH_2 \cdot SO_3H$ which crystallizes from methanol in thick clear prisms melting with decomposition at 220° C. (corr.), one part of which is soluble in 40 parts of hot water and in 400 parts of cold water, yielding stable aqueous solutions, and which is suitable for therapeutical purposes.

ARTHUR STOLL.
ALBERT HOFMANN.

REFERENCES CITED

The following references are of record in the file of this patent:

UNITED STATES PATENTS

| Number | Name | Date |
|---|---|---|
| 2,086,559 | Kharasch | July 13, 1937 |
| 2,156,242 | Kharasch et al. | Apr. 25, 1939 |

OTHER REFERENCES

Helv. Chim. acta, vol. 26 (1943); pages 1570–1601 and 2070–2081.